(12) United States Patent
Ackley

(10) Patent No.: US 8,256,555 B2
(45) Date of Patent: Sep. 4, 2012

(54) THREE-WHEELED MOTORCYCLE

(76) Inventor: Raymond Ackley, Melbourne, FL (US)

( * ) Notice: Subject to any disclaimer, the term of this patent is extended or adjusted under 35 U.S.C. 154(b) by 0 days.

(21) Appl. No.: 12/806,286

(22) Filed: Aug. 9, 2010

(65) Prior Publication Data

US 2011/0036655 A1    Feb. 17, 2011

Related U.S. Application Data

(60) Provisional application No. 61/273,865, filed on Aug. 10, 2009.

(51) Int. Cl.
*B62D 61/06* (2006.01)
*B62D 21/02* (2006.01)
*B62K 5/04* (2006.01)

(52) U.S. Cl. ........ 180/210; 180/311; 180/312; 280/781; 280/798

(58) Field of Classification Search ................ 180/68.1, 180/68.2, 68.3, 69.2, 210, 215, 311, 312; 280/124.109, 124.134, 781, 785, 798
See application file for complete search history.

(56) References Cited

U.S. PATENT DOCUMENTS

| | | | | |
|---|---|---|---|---|
| 2,047,336 A * | 7/1936 | Stout | ............................... | 180/62 |
| 4,060,957 A * | 12/1977 | Birkenfeld et al. | ............. | 53/442 |
| 4,064,957 A * | 12/1977 | Parham | ........................ | 180/215 |
| 4,368,795 A * | 1/1983 | Tidwell | ......................... | 180/212 |
| 5,062,662 A * | 11/1991 | Cameron | ...................... | 280/733 |
| 5,116,069 A * | 5/1992 | Miller | ......................... | 280/5.509 |
| 5,954,364 A * | 9/1999 | Nechushtan | ................... | 280/781 |
| 6,170,596 B1 * | 1/2001 | Triarsi et al. | ................... | 180/291 |
| 6,435,522 B1 * | 8/2002 | Van Den Brink et al. | . | 280/5.509 |
| 6,935,653 B2 * | 8/2005 | Koh | ............................ | 280/728.2 |
| 7,090,234 B2 * | 8/2006 | Takayanagi et al. | ... | 280/124.103 |
| 7,207,408 B2 * | 4/2007 | Kuroki et al. | .................. | 180/210 |
| 7,287,621 B2 * | 10/2007 | Kuroki et al. | .................. | 180/374 |
| 7,331,600 B2 * | 2/2008 | Miyata | ........................ | 280/730.1 |
| 7,445,070 B1 * | 11/2008 | Pickering | ....................... | 180/211 |
| 2003/0025608 A1 * | 2/2003 | Pederson | ..................... | 340/815.45 |
| 2008/0001470 A1 * | 1/2008 | Craig et al. | ....................... | 303/3 |
| 2008/0042390 A1 * | 2/2008 | Geslin et al. | ............... | 280/124.1 |

* cited by examiner

Primary Examiner — Joseph Rocca
(74) Attorney, Agent, or Firm — Leo G. Lenna

(57) ABSTRACT

A three-wheel motorcycle having a support frame with rear wheels mounted on a double axle with differential there between for a drive from a powerful automobile type engine. A front portion of the frame supporting the front motorcycle type single steerable wheel and handlebars mounted thereto for conventional steering. Other features include a unique shock and spring mechanism for the support frame measuring no more than 6 inches off of the ground and having a center of gravity of 14 inches or less powered by an internal combustion engine.

17 Claims, 6 Drawing Sheets

THREE-WHEELED MOTORCYCLE

CROSS-REFERENCE TO RELATED APPLICATION

This application is a non-provisional application and claims benefit to provisional application having the Ser. No. 61/273,865 filed Aug. 10, 2009, the disclosure of which is incorporated herein by reference in is entirety.

FIELD OF THE INVENTION

This invention relates generally to motorcycle-type devices having three wheels having high and reliable performance, maneuverability, usability, safety, gas mileage as a passenger-type vehicle as well as a sleek aerodynamic design.

BACKGROUND OF THE INVENTION

A common problem with known three-wheel motorcycles, known as "trikes", is their vulnerability to flipping or turning over upon entering and/or maneuvering through a turn at high speeds, or even at more moderate speeds. This tendency to turn or flip over makes trikes, in general, dangerous even to the most experience drivers. The problem of flipping or turning over is created by centrifugal force acting upon the relatively high center of gravity of the vehicle of the existing trikes. Conventional trikes lean into a turn and thus lower the center of gravity and effectively counterbalance the centrifugal force to prevent this flipping over or turning over. However, with three-wheel vehicles this normally cannot be done because of the action of three wheels instead of two. Thus, one major problem that exists today with trikes is there to flip or turnover when maneuvering turns even at normal speeds.

Another problem with known devices that do permit the banking or tilting of the operator and/or passengers is that a good portion or even most of the weight of the vehicle itself does not tilt which only partially solves the problem. The engine of the vehicle is one of the heaviest components overall and failure to mount the power plant so that it may bank is one of the limitations of these known devices. Again the problem in these vehicles is due to the relatively high center of gravity. A trike having a design that allows the rifer to tilt the trike so as to achieve a better center of gravity requires skill and total concentration at all times. A single distraction and failure to tilt the trike enough could cause the trike to tip or turnover with disastrous results.

Yet still another problem of known devices, which employ mechanism for banking or tilting portions of the vehicle, is that they do not provide fail-safe mechanism for the operating structure thereof. That is, if something should happen during the operation of the vehicle, they will not normally resume a neutral or upright position by themselves after the turn is completed. This could cause the trike to crash if tilting of the trike is not brought to the proper position after the turn is completed. Again, even riders with the most skill can misjudge a turn and tip or overturn.

Still yet another problem that exist with trikes available today is that the designs available have a tremendous wind resistance and drag thereby making them less fuel efficient than can be expected from a vehicle with the weight-to-power ratio.

Another problem with existing trike is the comfort level of the rider and passenger during riding. Trikes available on the market today require that the rider and passenger sit in an upright position with their legs dangling below the seat. This position not only places most of the weight on the butt thereby leading to back strain, but also impedes bloods flow to the lower extremities. This makes it necessary for the driver and passenger to stop frequently to prevent medical problems such as cramps and blood clots that can be disastrous when driving.

Still yet another problem with the existing tikes is there lack of storage room. Simply put most trikes do not have any storage room. Instead, a trailer is usually hitched to the trike in order to provide storage. This not only makes the trike unstable, but it also increases fuel consumption due to one or more additional wheels being on the road.

These problems together with many others such as difficulty in cooling internal combustion operated engines, the structural mounting of said engines, the problem of shock absorbing structures together with the lack of an automatic or semi-automatic operation all make existing tikes undesirable for average user.

All in all, a need currently exist for a trike with better maneuverability and performance, a design that decreases tipping and overturning, better aerodynamics, higher gas mileage, better storage without additional wheels on the road, and a trike that is generally more comfortable than existing trikes. The present invention is directed to an improved trike that has a permanent lower center of gravity and sleek design that overcomes the problems with existing three wheeled motorcycles on the road today.

The present invention is further described below in the figures and description thereof.

SUMMARY OF THE INVENTION

An object of the present invention is to provide a three-wheel motor vehicle which is powered from two rear wheels mounted on a primary support frame connected to a single steerable front wheel with a low center of gravity in order to reduce tipping or overturning of the three-wheel motor vehicle, Known as a trike.

Another object of the present invention is to provide an improved three-wheel motor vehicle having outstanding safety characteristics and overall operating efficiency.

Another object of the present invention is to provide an aerodynamically designed three-wheel motor vehicle with a low center of gravity to overcome the effects of centrifugal force when the vehicle is going into and through a turn at normal and high speeds so as to maneuver the turn with complete safety and at speeds much higher than would normally be safe.

Yet another object of the present invention is to provide a three-wheel motor vehicle that provides more ergonomically designed seating for a driver and at least one passenger. The ergonomically designed seating allows the driver and passenger to experience less back strain, reduced cramping and increased blood flow to the lower extremities thereby reducing the chance of clotting. In fact, not only does the design of the present invention reduce the chance of blood clotting the rider's comfort is greatly improved over conventional trikes. Elderly riders, arthritis affected riders, handicapped riders and overweight individuals can enjoy the three wheeled motorcycle of the present invention with less pain than riding other motorcycles and/or conventional trikes.

Still yet another object of the present invention is to provide a three-wheel motor vehicle having ample storage space within the three-wheeled structure itself thereby reducing the need for hitching a storage trailer to the three-wheeled motor vehicle. This increases the safety, since having ample storage space within the three-wheeled structure itself reduces the need to add an additional trailer to the back of the three wheeled motorcycle which when hitched, makes the motorcycle unstable.

An additional object of the present invention is to provide a three-wheel motor vehicle employing the exceptionally strong chrome molly high carbon steel (having 90,000 lb tensile strength per linear inch) frame providing exceptional safety and protection. Yet another object of this invention is to provide a high performance high-powered three-wheel motorcycle with stabilizing aerodynamics and superior front suspension.

One important feature is in the uses an economical high-powered water-cooled automotive internal combustion engine of far greater horsepower and reliability than is common with normal two-wheel motorcycle. Furthermore, even though the overall vehicle has much greater power and high-speed capability than conventional type motorcycles, the safety factor is nevertheless greatly increased there over. In addition, each wheel has appropriate individual brake mechanism associated therewith so that if one or even two of the brakes should be lost or become inoperative, the others or remaining one will still be functional.

The three-wheel motorcycle disclosed herein has a number of new and unique features that greatly increase the overall efficiency and safety thereof. The basic structure includes a main overall outer frame having supported from the rear thereof a pair or set of drive wheels connected by axles to a center differential for drive from universal joints and drive shaft by a high-powered internal combustion engine. A single steerable front wheel of conventional motorcycle type and steering handle bar structure in order to affect turning and steering of the single front wheel. An independent shock and spring structure for each wheel is associated with the frame structures to provide a comfortable safe ride. The three-wheeled motorcycle disclosed herein is designed so that the operator's seat along with at least one passenger seat sits in the high carbon steel frame at a position that provides a lower point of gravity than existing three-wheel motorcycles. The sleek aerodynamic design of the trike of the present invention adds to the low point of gravity to provide superior stability, safety, aerodynamics, and better gas mileage. The trike of the present invention provides a general-purpose people carrying structure with greater capacity, stability, safety and style that conventional three-wheel motorcycle lack.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PRESENT INVENTION

Figure 1:
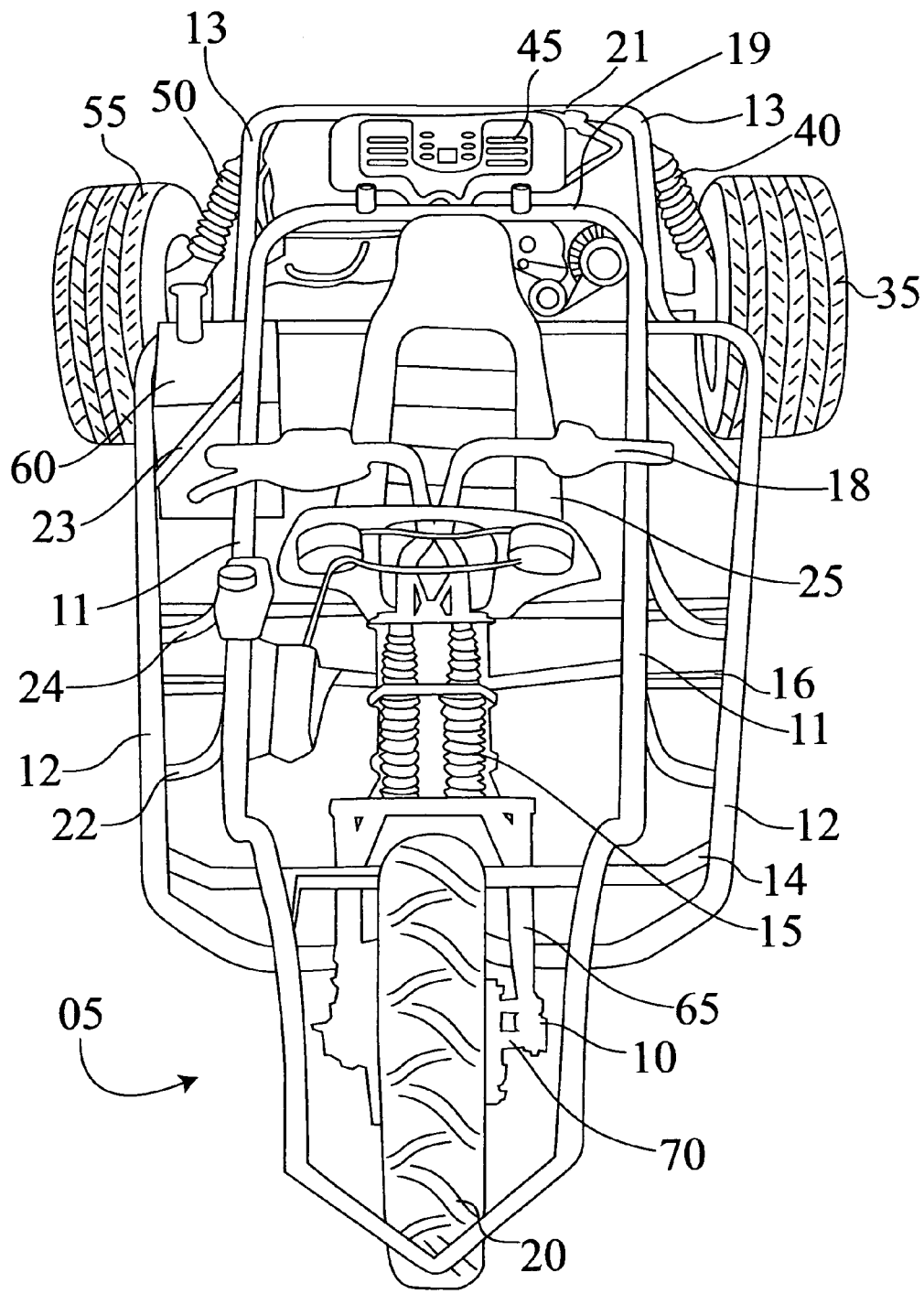
FIG. 1 is a top plan of the three-wheel motorcycle of this invention.

The present invention is directed to a stable, fuel-efficient three-wheeled motorcycle having a very low center of gravity, a sturdy frame, ample storage room, and excellent maneuverability.

The wheeled motorcycle of the present invention contains a metal frame that fully encases the driver and one passenger depending on the model that is being discussed. The tubular frame can be made from an extremely strong steel frame, namely 3140-chrome molly carbon steel. Although expensive, this steel has the tensile strength of about 90,000 pounds per square inch. This type of steel is used in high-speed racecars and is known for its strength and lightweight. Although this is the preferred type of material to be used other types of steel, metals, alloys, composite materials, man-made materials and combinations thereof can also be used.

The frame can be made from a single cast/mold or can be made out of separate pieces that are welded together. Should the frame be welded together, it is very important that the welding is done by a trained professional so as to maintain the high standards of the machine. For example, the welding can be done by aircraft certified welders so as to make sure that the high strength of the frame is not compromised. The lightweight three-wheeled motorcycle, weighing under about 1,300 pounds, can withstand a side impact from a larger, heavier vehicle and still remain intact. The high impact frame and composite body, protects the driver and passenger and is designed so as to basically "bounce" off of the other vehicle without crumbling. This prevents the driver and passenger from becoming entrapped in a crumbled vehicle. That is the unique 360-degree protection protects the driver and the passenger from impact from all angles.

The trike can also be equipped with a three-point safety harness as used in racing cars as well as airbags to further protect the driver and the passenger in case of an accident. Still further the molly steel frame can be configured to have a headrest fro both the driver and passengers so as to protect the occupants from backlash in a rear end collision.

For safety reasons it is important that the three-wheeled motorcycle of the present invention be configured so as not to roll over when hit by another vehicle or while turning. The three-wheeled motorcycle of the present invention achieves this no-rollover feature because of its very low center of gravity and wide wheelbase. The three-wheeled motorcycle of the present invention is also equipped with independent suspension that allows each wheel to react independently to different forces and/or surface elevations that also aids in stabilizing the motorcycle and preventing rollovers. As further discussed below, the center of gravity of the three-wheeled motorcycle of the present invention is slightly over a 1 foot with very little weight above the 2-foot mark. The unique configuration of the three-wheeled motorcycle of the present invention places 99 percent of the total weight (excluding the driver and passenger) over the rear axles that allows the weight transfer to the front braking wheels to be extremely high which is important for controlled high speed braking. Including the weight of the passenger, the transfer of weight is even higher allowing for even more controlled high speed braking.

As stated above, the three-wheeled motorcycle has a very wide wheel base, over 75 inches, much more than any other three-wheeled motorcycle available on the market today. In fact, the wheelbase can be over 77 inches depending on the wheel size. This amazing wheelbase provides superior stability and is equal to the wheelbase of a Chrysler 300 vehicle.

In addition, the three-wheeled motorcycle also uses very wide rear tires in order to provide superior stability and control in side loading of tight high-speed turns. The wide tires are also allows for the tremendous stooping power thereby keeping the vehicle straight and under control. An additional safety feature of the three-wheeled vehicle of the present invention is a dual braking system. There are two independent complete breaking systems that are not related to each other. This assures that the three-wheeled vehicle can be brought to a complete stop even if one of the braking systems fails. This feature is typical for two-wheeled motorcycles but not for three-wheeled motorcycles.

The body of the three-wheeled motorcycle that encloses the complete frame, motor, suspension and can optionally be equipped to enclose the driver cabin so that the motorcycle can be driven in the rain keeping the driver and the passenger dry. This cannot be done with either two-wheeled motorcycles or other three-wheeled motorcycles available on the market today. The body can be fabricated from many different types of materials as long as the material is lightweight and has a high tensile strength. Some types of materials include Kevlar®, Kevlar®-like material, fiberglass reinforced material, man-made materials and combinations thereof. The body is configured to be aerodynamic and the surface is smooth so as to reduce wind friction and increase fuel efficiency. The front nose of the body is V-shaped so that at high speeds the front of the three-welled motorcycle is stabilized laterally as well as horizontally.

In order to aerate the passenger compartment, the body is equipped with air induction ports. In one embodiment of the present invention, the body is equipped with air induction ports on each side of the body to proportionally distribute the air in the passenger cabin without compromising the stability of the vehicle.

The three-wheeled motorcycle is steered by handlebars attached to a single front wheel having an independent suspension and braking system. Since the motor and transmission is positioned in the rear, steering is relatively easy since most of the weight is not on the front axle. As stated above, braking capabilities are also enhanced since upon braking, the weight over the rear axle is transferred to the front wheel thereby increasing the braking friction of the front wheel tremendously. This is very important in reducing tire-lockup and increasing stability during hard braking. The body is designed so as to allow full radius turns leaving ample room for the movement of the handlebars. In the alternative, a small steering wheel can be used instead of the handlebars. The front suspension and steering allows a turning radius of about 15 ft making tight turns and u-turns effortless.

The three-wheeled motorcycle of the present invention is powered by a combustion or electric hybrid engine that is attached to a transmission to drive the wheels. Although a standard transmission can be used, an automatic transmission is preferred so as to allow the operator to keep both hands on the handlebars and to concentrate on the road and traffic ahead. The automatic transmission can be 4 or 5 speed with reverse. This is an uncommon feature of most three-wheeled motorcycles on the road today. Both the motor and the transmission can be regulated by a computer to allow top performance at all times.

Many different motors can be used as long as they have sufficient horsepower, e.g. over 150 hp, to enable the three-wheeled motorcycle to easily cruse at 55 mph and reach speeds up to 90 mph. One embodiment of the three-wheeled motorcycle of the present invention is equipped with a General Motors (GM) Echotech 4 cylinder engine with standard horsepower of 150 horse power. Other GM® motors that can be used include Super-charged 260 HP that can be modified to bring the HP up to about 350 HP. These engines under normal conditions should last for more than 100,000 miles and get between 70 miles per gallon (MPG) to 90 MPG.

Another embodiment of the present invention uses a Chrysler® V6 high output fuel injected 260 HP having a fuel efficiency between 55 MPG to 65 MPG under standard conditions. Still yet another embodiment of the present invention uses a GM® 350 cubic inch V8 engine having 350 HP which when modified can have over 450 HP. This engine will provide tremendous power and still provide great fuel efficiency. Under standard conditions, this engine can get over 45 MPG because of the sleek aerodynamic design and the lower weight than even the smallest Smart Car®. In fact, the three-wheeled motorcycle of the present invention is a great alternative to the Smart Car® which is designed for people looking for high fuel efficiency. Unlike the Smart Car®, the three-wheeled motorcycle of the present invention provides both fuel efficiency and safety. That is, the three-wheeled motorcycle of the present invention combines fuel efficiency, the fun and experience performance when driving a motorcycle with safety.

In additional embodiments of the present invention, the three-wheeled motorcycle is powered by alternative fuel engines and/or electric engines instead of standard fossil fuel engines. With these alternative fuel engines, additional fuel mileage can be experienced making the three-wheeled motorcycle of the present invention even more cost effective and environmentally friendly.

The three-wheeled motorcycle of the present invention is to provide amble lighting so as to assure that the motorcycle can be seen in day and at night. This is one of the many safety features that are part of the three-wheeled motorcycle of the present invention. In one embodiment of the present invention the motorcycle is equipped with at least three high-powered 100 watt conventional or halogen headlights that face forwardly. Each of the three lights can be controlled and positioned independently in order to adapt the positioning of the lights according to the conditions. In addition, the three-wheeled motorcycle of the present invention is equipped with numerous LED, Halogen and filamentous lighting to assure visibility from every angle. The body is also equipped with dual turning signals on each side as well as in the rear of the vehicle so that all turns can be seen from all angles. In addition, the body has one mirror on each side that can be also be equipped with directional signals as well.

Other comforts not normally available in conventional motorcycles can also be included in the design of the three-wheeled motorcycle of the present invention such as heated seats, cabin heaters and air conditioners, a radio and even Global Positioning Systems.

The exemplary embodiments illustrated in the Figures show a three-wheeled motorcycle of the present invention having superior stability and features of existing motorcycles. That is, the three-wheeled motorcycle of the present invention is designed to provide additional stability and comfort to the motorcycle experience while still maintaining the feel and touch of a motorcycle.

The present invention may be understood more readily by reference to the following detailed description of the invention taken in connection with the accompanying figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Particular examples used in describing the three-wheeled motorcycle of the present invention are provided to simply assist the reader in understanding design and function of the device and in light of the specification it will be clear that the device of the present invention can be used in other bone graft procedures.

Also, as used in the specification and including the appended claims, the singular forms "a," "an," and "the" include the plural, and reference to a particular numerical value includes at least that particular value, unless the context clearly dictates otherwise.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

As used herein, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

Reference will now be made in detail to the exemplary embodiments of the present disclosure, which are illustrated in the accompanying figures. Turning now to FIGS. 1-6, where the components of the three-wheeled motorcycle in accordance with the principles of the present disclosure are provided.

Figure 2:
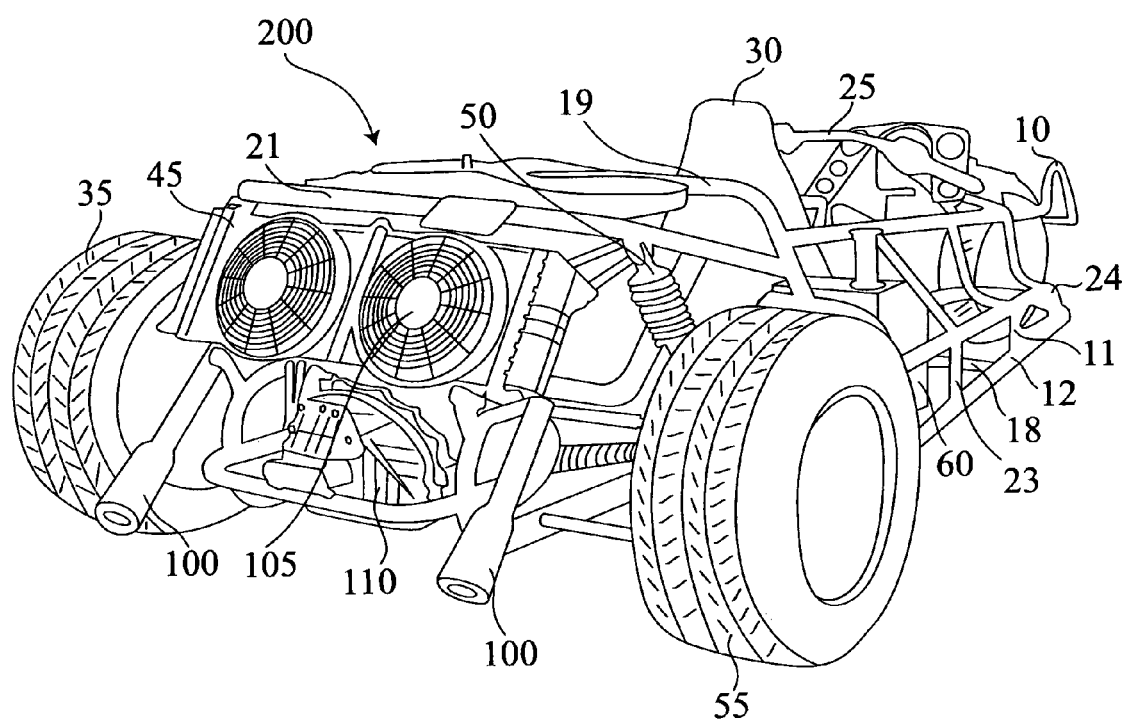
FIG. 2 is a side elevational view of the three-wheel motorcycle of this invention.
Figure 3:
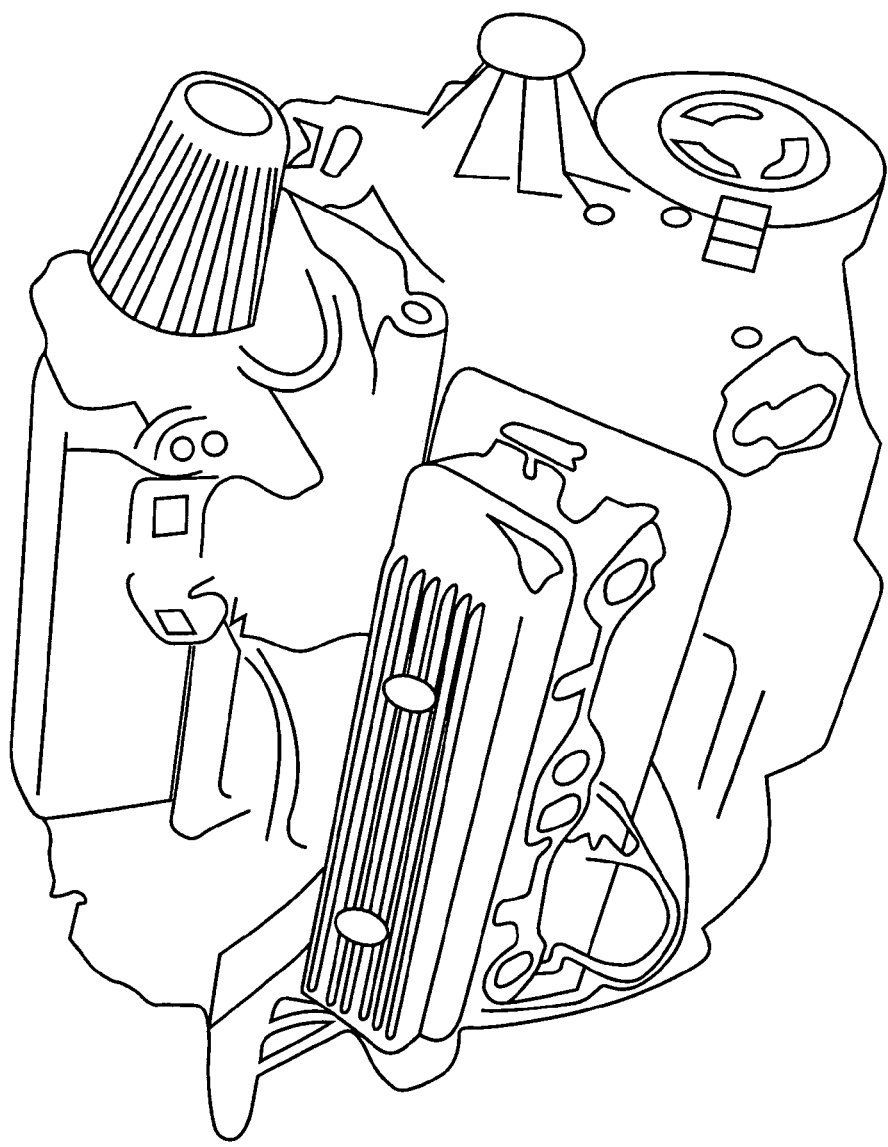
FIG. 3 is a side perspective view of one possible engine that can be used to power the three-wheel motorcycle of the present invention.

Referring to FIG. 1 of the drawings, reference numeral 05 indicates in general the three-wheel motorcycle of the present invention. As shown, the three-wheeled motorcycle of the present invention is shown in its normal upright position. FIGS. 1, 2 and 3, show the basic structure of the three-wheeled motorcycle of the present. As shown in FIG. 1, the tubular frame 10 of the present invention has longitudinal portions 11, 12 and 13 that extend from the front of the motorcycle towards the rear of the motorcycle. These longitudinal portions are connected by several transverse portions spanning side to side, namely, 14, 16-19 and 21. Both the longitudinal and traverse portions of the three-wheeled motorcycle are further connected by latitudinal portions, 22, 23 and 24 that connect and provide support for the longitudinal and traverse portions of the tubular frame. All together the longitudinal, latitudinal and traverse portions make up the tubular frame that is designed to encase the driver and a passenger of the three-wheeled motorcycle of the present invention. The frame is designed to sit no more than 5 inches off of the ground to have 85% to 98% of the weight positioned on the rear tires. This frame configuration allows the three-wheeled motorcycle to have an extremely low center of gravity. It also positions the majority of the weight behind the driver over the wide wheelbase. One embodiment of the three-wheeled motorcycle of the present invention has a width of about 76 inches, a length of about 122 inches, a weight of about 1,275 pounds and a center of gravity about 14 inches.

Independent suspension systems 40 and 50 of the three-wheeled motorcycle of the present invention are attached to the frame at one end and to an axle at the other end to provide independent suspension for each of the rear tires (35, 55). The front tire 20 is attached to the front end 65 including axle 70 which has its own independent suspension system 15. The front end is attached to handle bars 25 that are used to steer the three-wheeled motorcycle of the present invention. Within the frame 05 and between the motor 45 and the front end 70 is at least one seat 30 for a driver. Other embodiments of the present invention are configured with a passenger seat positioned directly behind the driver seat. The seats are very low to the ground, which is essential for the low center of gravity.

The front wheel 20 is attached to the front end 65 including axle 70 which has its own independent suspension system 15. The handlebars 25 are mounted to the steering fork 65 that is connected to the frame in a configuration that allows the handlebars 25 to steer the front wheel 20 from side to side. Thus, as the handlebars 25 are turned in one direction, the steering fork 65 and single steering front wheel 20 mounted therein will correspondingly turn in the same direction just like a simple two-wheel bike. Thus, as can be readily visualized, by turning the handlebars 25 in one direction or the other, the front wheel 20 will correspondingly turn in the same direction.

Within the frame 05 and between the motor 45 and the front end 70 is at least one seat 30 for a driver. Other embodiments of the present invention are configured with a passenger seat positioned directly behind the driver seat. The seats are very low to the ground, which is essential for the low center of gravity. The passenger seat is directly behind the driver's seat. In one embodiment of the present invention, the three-wheeled motorcycle can have two seats behind the driver's seat in a side-by-side arrangement. The driver's seat is about 7 inches above the ground and the passenger seat(s) is 11 inches above the ground, which allows for forward visibility. In other words, the positioning of the passenger seat allows the passenger to see over the shoulder of the driver when driving.

Slightly in front of the rear left wheel is gas tank 60 and mounted in the same general vicinity to the frame is at least one battery. The fuel tank has a capacity of about 14 gallons and is forward of the steel firewall that protects the passenger(s) from the engine. The firewall also reduces heat transfer into the passenger compartment. The fuel tank is fully incased within the steel frame to protect rupturing when impacted. One embodiment of the present invention has a fuel tank that is about 4 inches high, about 44 inches wide and is about 5 inches off of the ground. A hard steel plate is interfaced between the ground and the tank to prevent rupturing should contact with the ground occur.

Looking at FIG. 2, the engine 45 having a conventional type multi geared transmission 110 is appropriately connected by universal joints by means of a drive shaft extending to the differential. Attached to the engine 45 is a duel fan cooling system designed to keep the motor within operating temperatures under normal and harsh conditions. The engine 45 has dual exhaust extending to duel exhaust pipes 100. The other features shown in FIG. 2 are also described in FIG. 1. This rear view provides a clear prospective on the actual width and low center of gravity profile of the three-wheeled motorcycle of the present invention.

Figure 4:
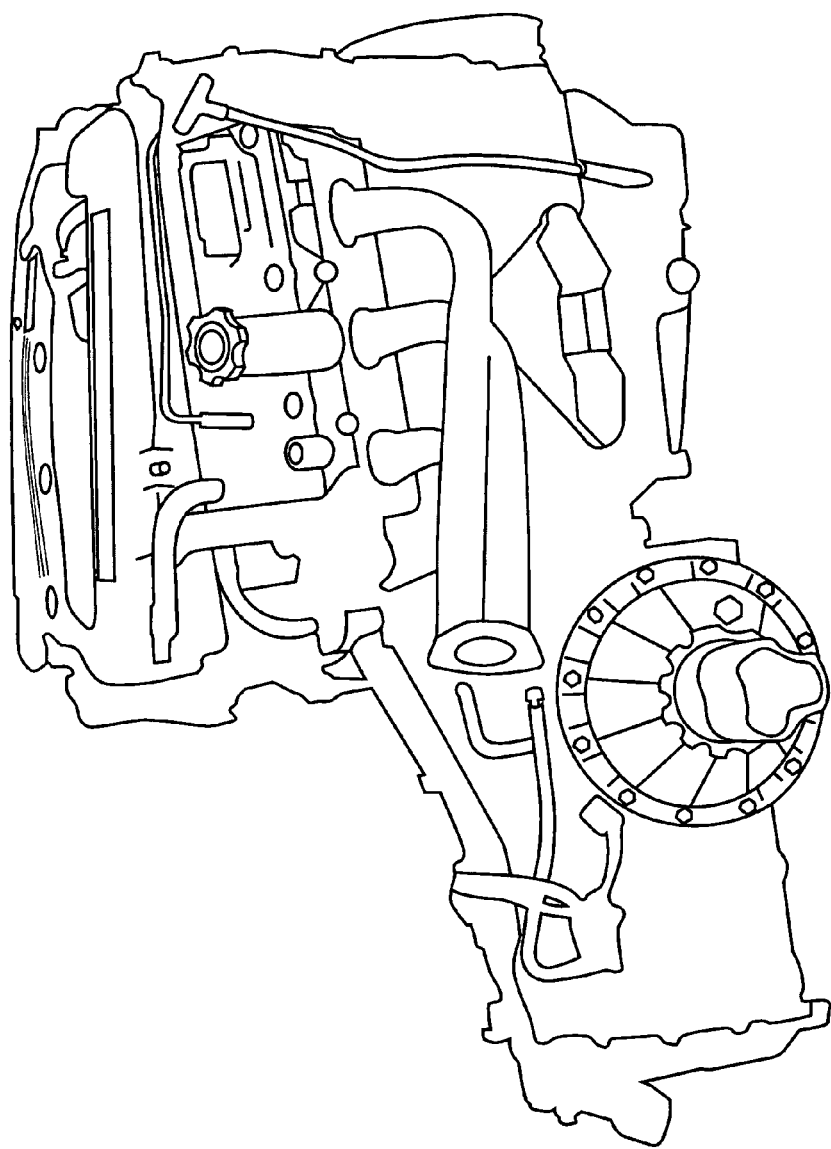
FIG. 4 is a side perspective view of one possible engine attached to a transmission that can be used to power the three-wheel motorcycle of the present invention.

FIG. 3 shows a side perspective view of one possible engine 160 that can be used to power the three-wheel motorcycle of the present invention. The engine 160 is a GM® small block 327 CI-350CI-377CI adapted to transaxle in a 4 speed automatic transmission. The engine 160 is attached to the frame of the three-wheeled one of the present invention by resilient motor mounts that are specifically designed for supporting the engine 160. Basically, the engine 160-attachment assembly consists of structural members that are appropriately shaped and formed with an aperture therein for reception of a retaining bolt and a resilient yet firm motor mount. This motor mount, as is conventional, will absorb much of the vibration forces that are inherent in any internal combustion engine 160 transmission that is operatively connected to the engine 160 to the frame structure. Although this engine is shown in FIG. 4, it is understood that other engines can work equally as well and can be substituted with the current engine without deviating from the spirit of the present invention. Diesel engines can also be used.

FIG. 4 is a side perspective view of another possible engine and transmission combination that can be used in connection with the present invention. The engine 175 is a Chrysler 280 HP engine connected to a transmission. As with the engine described in FIG. 3, this engine is also attached to the frame by the same type of resilient motor mounts that are designed to absorb vibrations and prevent shift of the engine during acceleration. In one embodiment of the present invention, an electric handlebar speed shifter for the automatic transmissions can be used in place of an auto shifter mounted elsewhere. This would provide quick shifting through each gear allowing better up shifting and down shifting of the gears for excellent gear control.

Figure 5:
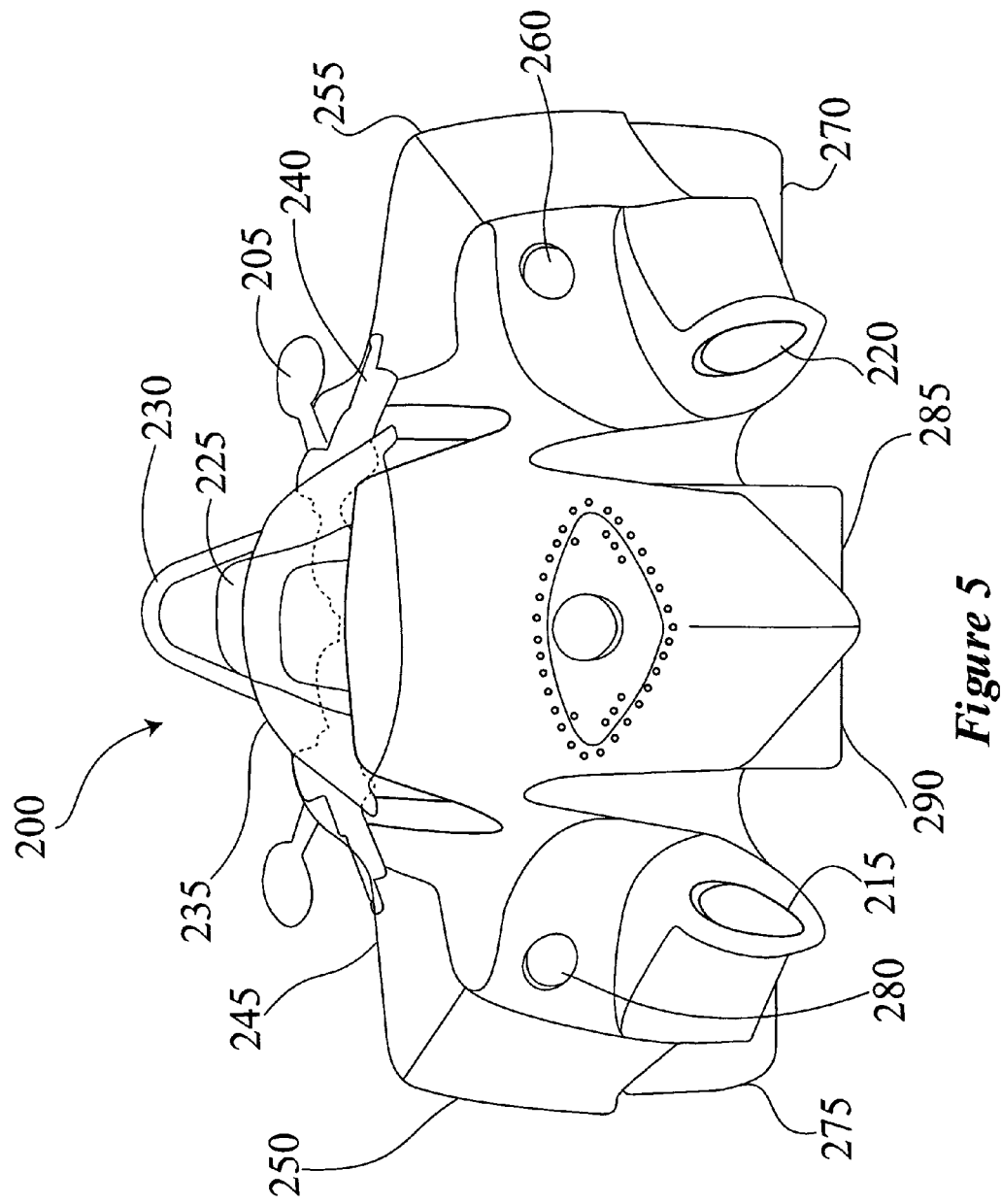
FIG. 5 is a perspective view of the three-wheel motorcycle of the present invention.

FIG. 5 is a perspective front view of the body 200 of the three-wheel motorcycle of the present invention. The body 200 is configured to fit over the frame shown in FIGS. 1 and 2 so as to substantially enclose the driver and passenger compartment of the motorcycle of the present invention. The body 200 has a left fender 250 and a right fender 225 and a central portion that connects the right and the left fenders. The left and right fenders 250 and 225 are configured to cover the rear wheels of the motorcycle of the present invention while the central portion is configured to cover the front wheel of the motorcycle. The left fender, right fender and central portion of the motorcycle are all aerodynamically designed so as to reduce air friction and to utilize the force of air flowing over the body to push the body of the motorcycle down onto the ground and maintain stability of the vehicle at high speeds. That is, the body acts as a large airfoil providing downward pressure to allow the body to hug the ground so that it does not lift and turn over at high speeds. The right fender 225 and left fender 250 are each equipped with air scoops 215 and 220 respectively and are configured to funnel fresh air into the interior cabin of the motorcycle. The scoops also aid in cooling the engine, transmission and rear tires at high speeds.

The central portion 290 of the body 200 has at least one headlight 285 and a reinforced portion since this is area gets the direct pressure from the wind when traveling at high speeds. The upper boundary of the central portion 290 of the body 200 is fitted with a windshield 235 that deflects the wind from the drivers face when traveling. In one embodiment of the present invention, a full enclosure can be attached to the body 200 so as to protect the driver and passenger from the elements when used in the rain and cold. The left and right fenders are each equipped with headlights so as to provide amble light for traveling and assure that other vehicle operators can see the motorcycle when being operated. The fenders may also be equipped with turning lights signal and reflectors to provide additional lighting. Much like a standard motor vehicle, the body of the three-wheeled motorcycle is equipped with two mirrors 205 and 210. The mirrors are position one on each side. The handlebars 245 is equipped with braking handles 240 to activate the redundant braking system include for additional safety. The interior can have one or two seats positioned one behind each other with the bottom of the seat no more than 6 inches off of the ground so as to give a low center of gravity. The three-wheeled motorcycle of the present invention can be also equipped with roll bars located behind each seat for further protection.

The body is attached to the frame in such as way that it can be easily removed within 30 minutes and lifted off of the frame for easy cleaning and/or mechanical work. The body can have many different paint jobs both themed and plain paint. Should the frame be extensively damaged the frame can be replaced with a new body should the repair be more expensive than replacing the body.

Figure 6:
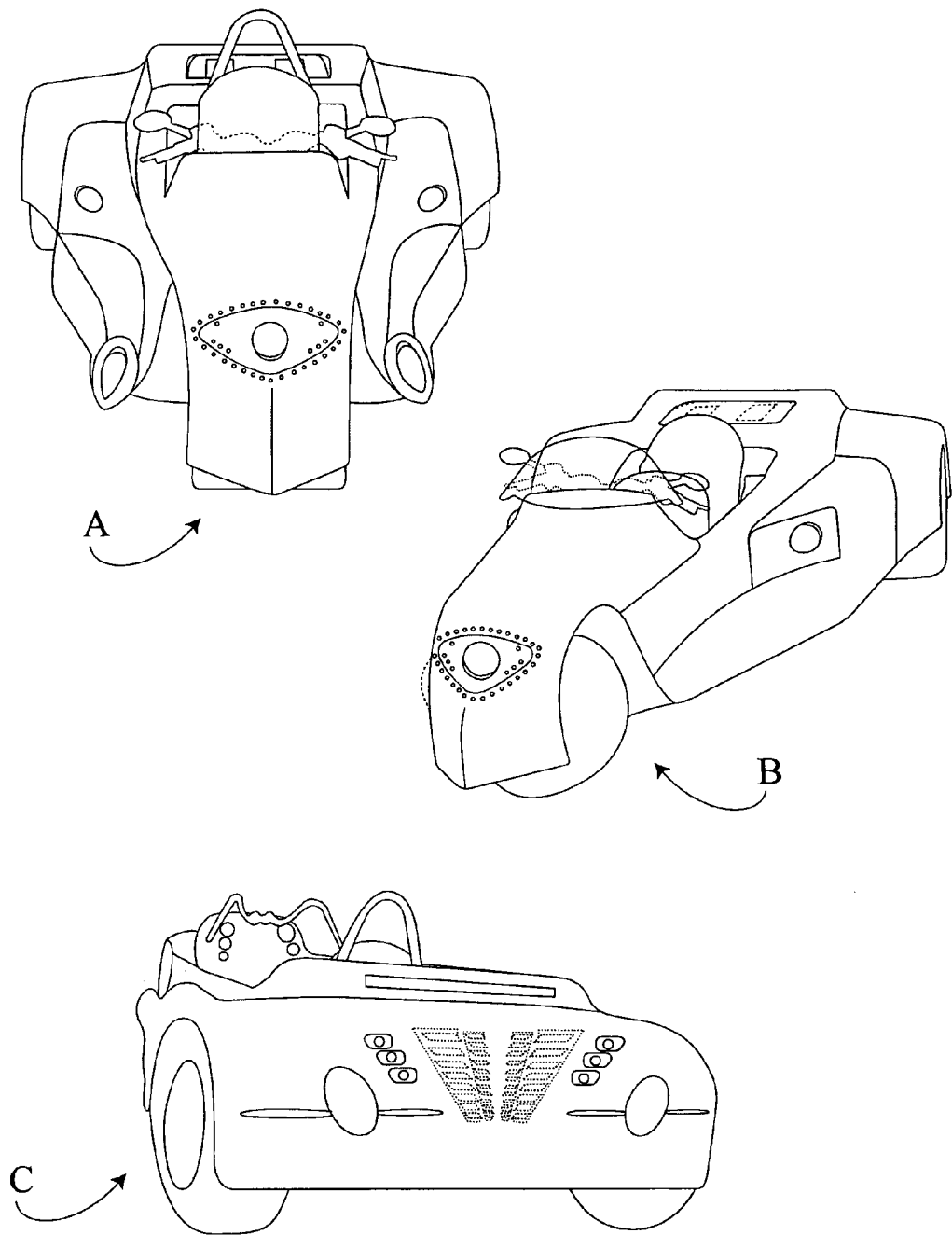
FIG. 6 is a front view, rear view and side view of the three-wheel motorcycle of the present invention.

FIG. 6 shows three different perspective views of the three-wheeled motorcycle of the present invention. View A is a side front view, view B is a back view and view C is a front perspective view. These three views show the sleek unique wide wheelbase, low profile design of the three-wheeled motorcycle of the present invention. It is understood that additional connectors, wiring, bearings, shifting cables, gears and other parts not described herein that are necessary for the three-wheeled motorcycle to operate are also included herein.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A three-wheeled motorcycle comprising:
 a frame having a front, middle and rear portion all elevated between 2 and 6 inches off of ground level thereby having a low center of gravity;
 a motor attached to said rear portion of said frame;
 a transmission connected to said motor, said frame and two independent axles wherein each of said two independent axles are attached to a wheel and are positioned in the rear portion of said frame;
 a front steering fork attached to said front portion of said frame comprising a single wheel for steering;
 at least one seating structure mounted to said frame between the rear and front wheels wherein the frame is configured so as to enclose the at least one seating structure so that a driver sitting in the seating structure is positioned within the frame so that the seating structure is completely surrounded by the frame so as to provide 360 degree protection of the driver by the frame; and
 a body configured to encase said frame, said rear wheels and said front wheel, said three-wheeled motorcycle configure to have a center of gravity of no more than about 10 to about 14 inches and a weight distribution profile having less than 5 percent of the total weight of said three-wheeled motorcycle is above about 2 feet from ground level; wherein said frame having said front, middle, and rear portions, comprises tubular members and further includes both a lower frame portion and an upper frame portion connected together to form a single unit; wherein a frontal area of the lower portion extends behind a rear portion of said single wheel; and wherein a frontal area of the upper portion extends forward of said single wheel such that the upper portion extends in front of both an axle of said single wheel and said front steering fork.

2. The three-wheeled motorcycle of claim 1 further comprising shock absorbing units comprising at least two shock absorbing rod elements wherein at least one of said at least two shock absorbing elements are positioned and pivotally attached to opposite sides of said frame so as to provide independent suspension for each rear wheel.

3. The three-wheeled motorcycle of claim 2 further comprising handlebars connected to said front steering fork.

4. The three-wheeled motorcycle of claim 1 having a wheelbase of about 70 to about 80 inches.

5. The three-wheeled motorcycle of claim 4 having a total gross weight of less than about 1300 pounds.

6. The three-wheeled motorcycle of claim 1 wherein the frame is tubular and made from material selected from the group consisting of chrome molly high carbon steel, steel, metal alloys, aluminum, titanium, copper, brass, thermoplastic composite material, man-made materials and combinations thereof.

7. The three-wheeled motorcycle of claim 6 wherein the body is made from material selected from the group consisting of Kevlar, fiberglass reinforced material, composite materials, and combinations thereof.

8. The three-wheeled motorcycle of claim 7 further comprising LED lights, turning signals, braking signals, and headlights positioned in the body of said three-wheeled motorcycle.

9. The three-wheeled motorcycle of claim 1 wherein said motor selected from the group consisting of a 4 cylinder engine, a V6 high output fuel injected 260 engine, and a 350 cubic inch V8 350 HP engine.

10. The three-wheeled motorcycle of claim 1 further comprising an attachment system configured to removably attach said body to said frame so as to allow access to said motor and said transmission so as to provide repair/maintenance.

11. The three-wheeled motorcycle of claim 1 wherein said body comprises a right fender and a left fender, said right fender and a left fender each equipped with air scoops configured to funnel fresh air into the interior cabin of said three-wheeled motorcycle and to cool said engine, said transmission and said rear tires at high speeds.

12. The three-wheeled motorcycle of claim 1 configured to have between about 85% to about 98% of the weight of said three-wheeled motorcycle is positioned in the rear portion of said frame.

13. The three-wheeled motorcycle of claim 1 wherein the overall width of said three wheeled motorcycle is about 70 to about 80 inches, the overall length is about 120 inches to about 130 inches, and the overall weight is about 1,200 to about 1,300 pounds.

14. The three-wheeled motorcycle of claim 1 further comprising a fuel tank.

15. The three-wheeled motorcycle of claim 1 wherein the motor and the transmission are integrated as a single unit and the motor is attached to the rear portion of the frame behind the driver between the two rear tires so as to distribute weight to the rear tires for enhanced traction and stability.

16. The three-wheeled motorcycle of claim 1 wherein each of the two rear tires have an independent suspension system for enhanced handling and stability on a road.

17. A three-wheeled motorcycle comprising:
a frame having a front, middle and rear portion all elevated between 2 and 6 inches off of ground level thereby having a low center of gravity;
a motor attached to said rear portion of said frame;
a transmission connected to said motor, said frame and two independent axles wherein each of said two independent axles are attached to a wheel and are positioned in the rear portion of said frame;
a front steering fork attached to said front portion of said frame comprising a single wheel for steering;
at least one seating structure mounted to said frame between the rear and front wheels wherein the frame is configured so as to enclose the at least one seating structure so that a driver sitting in the seating structure is positioned within the frame so that the seating structure is completely surrounded by the frame so as to provide 360 degree protection of the driver by the frame;
a fuel tank
wherein the motor and the transmission are integrated as a single unit and the motor is attached to the rear portion of the frame behind the driver between the two rear tires so as to distribute weight to the rear tires for enhanced traction and stability;
shock absorbing units comprising at least two shock absorbing rod elements wherein at least one of said at least two shock absorbing elements are positioned and pivotally attached to opposite sides of said frame so as to provide independent suspension for each rear wheel; and
a body configured to encase said frame, said rear wheels and said front wheel, said three-wheeled motorcycle configure to have a center of gravity of no more than about 10 to about 14 inches and a weight distribution profile having less than 5 percent of the total weight of said three-wheeled motorcycle is above about 2 feet from ground level; wherein said frame having said front, middle, and rear portions, comprises tubular members and further includes both a lower frame portion and an upper frame portion connected together to form a single unit; wherein a frontal area of the lower portion extends behind a rear portion of said single wheel; and wherein a frontal area of the upper portion extends forward of said single wheel such that the upper portion extends in front of both an axle of said single wheel and said front steering fork.

* * * * *